2 Sheets—Sheet 1.

H. A. ROBERTS.

Assignor to G. F. SWIFT.

REFRIGERATOR.

No. 9,786. Reissued July 5, 1881.

Witnesses.
Robt Emmett,
Charles B. Lothrop.

Inventor.
Henry A. Roberts.
By Geo. H. Lothrop
Atty.

2 Sheets—Sheet 2.

H. A. ROBERTS.

Assignor to G. F. SWIFT.

REFRIGERATOR.

No. 9,786. Reissued July 5, 1881.

Witnesses.

Robt Everett.

Charles B. Lothrop.

Inventor.

Henry A. Roberts.

By Geo. H. Lothrop

Atty.

UNITED STATES PATENT OFFICE.

HENRY A. ROBERTS, OF DETROIT, MICHIGAN, ASSIGNOR TO GUSTAVUS F. SWIFT, OF CHICAGO, ILLINOIS.

REFRIGERATOR.

SPECIFICATION forming part of Reissued Letters Patent No. 9,786, dated July 5, 1881.

Original No. 77,098, dated April 21, 1868. Application for reissue filed June 7, 1881.

*To all whom it may concern:*

Be it known that I, HENRY A. ROBERTS, of Detroit, in the county of Wayne and State of Michigan, have invented a new and useful Improvement in Refrigerators, of which the following is a specification.

Figure 1:
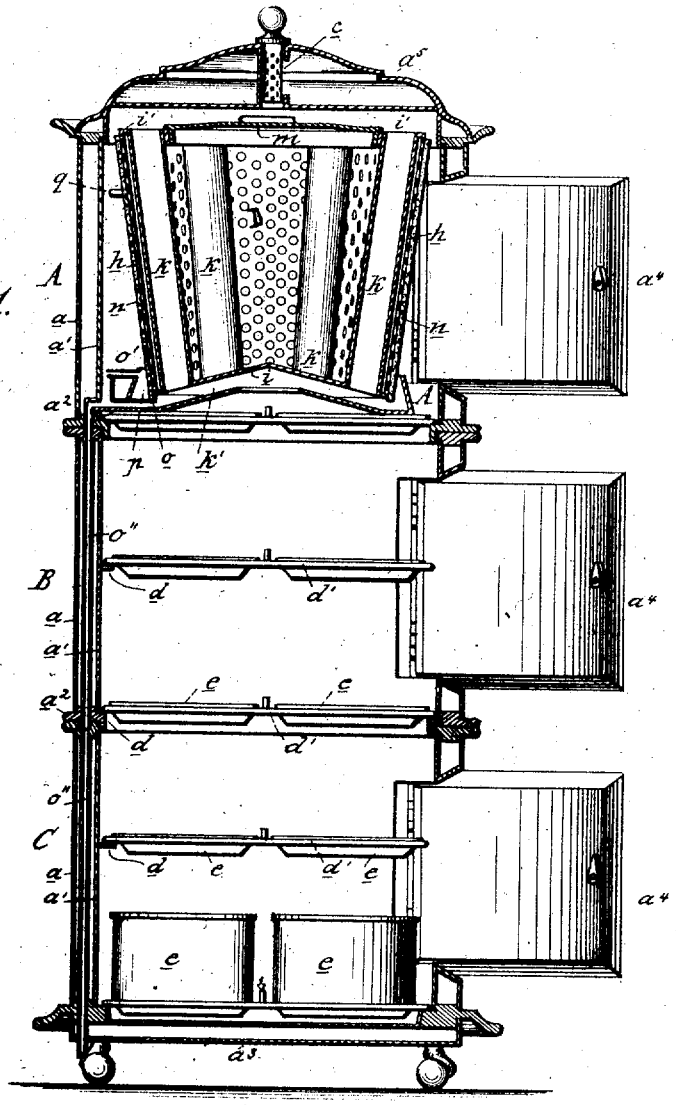
Figure 2:
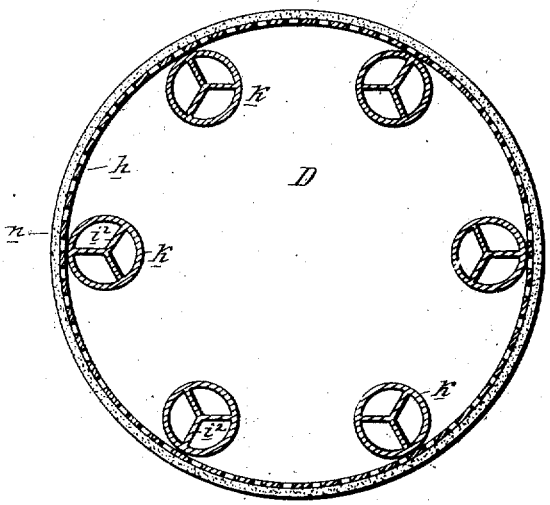
Figure 3:
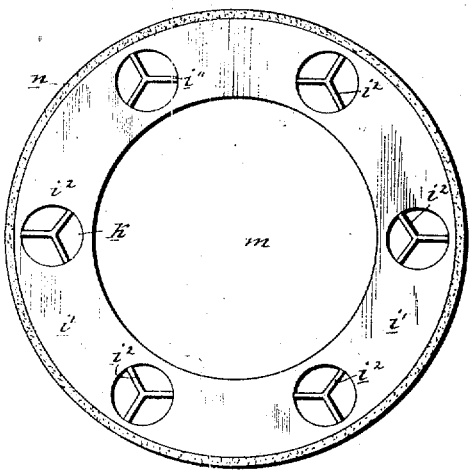
Figure 4:
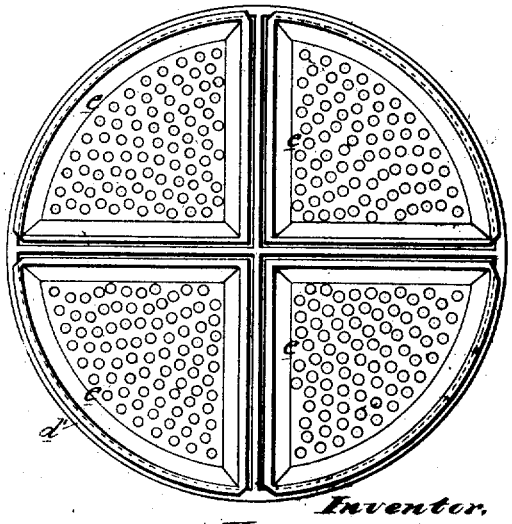

In the drawings, Figure 1 is a vertical section. Figs. 2 and 3 are horizontal sections through the ice-box, and Fig. 4 is a top view of one of the shelves.

My invention consists, first, in constructing a refrigerator in two or more sections, fitting vertically one upon the other, in such manner that sections can be readily added or taken away to increase or diminish the capacity of the refrigerator; second, in an ice-box for a refrigerator, which of itself is perfectly air-tight, removable, and adjustable at pleasure, having a vertical flue or a series of vertical flues open at the top and bottom, relatively to an intersecting horizontal flue having discharging-orifices for both circulating currents of air and the products of atmospheric condensation, when the same is arranged with a frigorific chamber, producing results of refrigeration by means of internal continuous circulation of currents of air, the outer walls of which are perforated and covered with fibrous or evaporating substances; third, in placing in a refrigerator an air-tight ice-box having an opening in its top provided with a tight-fitting cover, for the introduction of ice, and having one or more vertical flues running through said ice-box; fourth, in placing radial conductors in such flue or flues, to increase the cooling-surface in such flue or flues, and thereby increase the downward current of air through such flue or flues.

A, B, and C are three sections, which compose the body of this refrigerator, showing at a glance that it may be made and used in one, two, or more parts, as desirable.

*a a'* are the outer and inner walls, made of sheet metal or some other suitable material.

$a^2$ are the ring-flanges, by which the outer and inner walls are closed air-tight by means of bolts, soldering, or otherwise hermetically sealed, to render the space air-tight.

$a^3$ is the bottom, constructed with two thicknesses, impervious to air.

$a^4$ are doors fitted closely to their respective openings, constructed hollow, of sheet metal or other suitable material, and hung in the usual way.

$a^5$ is a cover, also constructed hollow, of metal or other suitable material, and so that it will fit the upper end of either of the sections. Through the center of this cover is provided a vent orifice or tube, *c*. The only object of this vent-tube is to ventilate the box or receptacle when the freezing material is exhausted.

Upon the inner walls of the sections are arranged rollers or brackets *d*, upon which the frames or shelves *d'* are supported, and rotate as desired, either to the right or left, in order to bring any one of the receptacles placed thereon directly before the door.

D is an ice-box arranged in the upper portion of the refrigerator, composed wholly of metal or other suitable material, the body *h* of which is perforated or tight and united to a tight bottom, *i'*, slightly conical in shape.

*k k'* are flues which pass through the top *i* and the bottom *i'* of ice-box D, in which flues are radial partitions $i^2$, to increase the cooling and condensing surface.

*m* is a cover which closes the top or opening of the ice-box, thereby rendering it air-tight. When ice-box D has perforated sides it is covered with a fibrous material, *n*, for the purpose of cooling the air by internal continuous circulation without coming in contact with the ice.

*o* is a discharge-pipe.

*p* is a fluid-cup, which receives the drip from the lower edge of the fibrous material *n*, and discharges the surplus water through pipe *o'*, near the upper edge of the cup, into discharge-pipe *o''*, and when the sides of ice-box D are tight the drip is led by a suitable pipe or discharge-orifice into cup *p* and discharged through pipes *o'* and *o''*.

The operation of this refrigerator is substantially as follows: The ice-box D being filled with ice, and the opening in the top closed by cover *m*, the ice cools the air within the flues *k k'*, and this air falls into the refrigerator, displacing a portion of the air in the refrigerator. As the refrigerator is air-tight, and the interior has no communication with the outside air, the air thus displaced rises around ice-box D to the top of the refrigerator, passes over the top of ice-box D into the flues *k k'*, and is again cooled and discharged downward through the flues.

When the sides of ice-box D are perforated and covered with fibrous material *n* the drip from the melting ice wets the fibrous material, thereby preventing the air in the refrigerator from coming in contact with the ice in ice-box D, and the upward current of air around ice-box D causes this moisture to evaporate, and thus adds to the cooling effect produced.

It will thus be seen that the air in the refrigerator is compelled to circulate down through the flues *k k'* and upward around the ice-box D, without the admission of any external air.

What I claim as my invention, and desire to secure by Letters Patent, is—

1. A refrigerator constructed of metal or other suitable material, of two or more sections, substantially as and for the purposes set forth.

2. The ice-box D, having close bottom, perforated sides covered with fibrous material, whereby the box is rendered air-tight, substantially as and for the purposes set forth.

3. In a refrigerator, a tight ice-box with an opening in the top thereof for filling the same with ice, and having a tight-fitting cover for said opening, provided with one or more vertical flues through said ice-box, as and for the purposes herein set forth.

4. The air-tight ice-box D, constructed, as hereinbefore described, with or without perforated sides and placed in a refrigerator, so that the air in the refrigerator can enter vertical flue or flues running through said ice-box at the upper end of such flue or flues, and pass downward through such flue or flues, and be discharged through a horizontal intersecting flue on the bottom of said ice-box directly into the refrigerator.

5. An ice-box, as above described, provided with a flue or series of flues, with or without radial divisions, for the circulation and condensation of air, substantially as described.

6. An ice-box, as above described, provided with a flue or series of flues, with or without perforated sides or evaporating-surface, substantially as described.

HENRY A. ROBERTS.

Witnesses:

CHARLES B. LOTHROP,
R. EDWARDS.